United States Patent [19]
Maphis

[11] 4,448,690
[45] May 15, 1984

[54] SUBSURFACE WASTE DISPOSAL SYSTEM

[75] Inventor: Sam W. Maphis, Boulder, Colo.

[73] Assignee: Genstar Waste Transfer, Inc., San Mateo, Calif.

[21] Appl. No.: 301,970

[22] Filed: Sep. 14, 1981

[51] Int. Cl.³ .............................. C02F 3/04; B09B 1/00
[52] U.S. Cl. .................................... 210/609; 210/617; 210/290; 111/7; 405/128
[58] Field of Search .............. 210/170, 241, 273, 279, 210/290, 609, 617, 901, 519, 96.1, 747, 614, 150; 405/128, 129, 38, 269; 111/7; 71/9, 12, 13; 422/184

[56] References Cited

U.S. PATENT DOCUMENTS

| | | | |
|---|---|---|---|
| 807,667 | 12/1905 | Dunbar | 210/617 |
| 845,744 | 3/1907 | Blaisdell | 210/273 |
| 1,604,379 | 10/1926 | Blaisdell | 210/273 |
| 1,784,798 | 12/1930 | Bayard et al. | 210/273 |
| 1,805,993 | 5/1931 | Miller | 210/170 |
| 2,149,680 | 3/1939 | Jewell | 210/290 |
| 2,842,077 | 7/1958 | Morrison | 111/7 |
| 3,038,424 | 6/1962 | Johnson | 111/7 |
| 3,865,056 | 2/1975 | Danford | 405/129 |
| 4,176,066 | 11/1979 | Sloan | 210/241 |
| 4,352,601 | 10/1982 | Valiga et al. | 405/128 |

FOREIGN PATENT DOCUMENTS

| | | | |
|---|---|---|---|
| 2306704 | 8/1974 | Fed. Rep. of Germany | 210/614 |
| 54-4104641 | 8/1979 | Japan | 210/747 |
| 651745 | 3/1979 | U.S.S.R. | 111/7 |

*Primary Examiner*—Charles N. Hart
*Assistant Examiner*—John W. Czaja
*Attorney, Agent, or Firm*—Kyle W. Rost

[57] ABSTRACT

A system for utilizing and disposing of sludge and other wastes employs an artificially created perched bed and a subsurface injector system that applies such wastes in a liquid or semi-liquid state to an aerobic portion of the bed. The solids from the waste mixture are suspended in the bed while the liquids percolate through the bed to an underdrain system for collection, monitoring, further treatment, ultimate reuse, or direct discharge. The system provides closed loop disposal of the waste stream in a completely controlled environment without impact to the local environmental system. The bed's selected media can be changed into a beneficial by-product—top soil—through the addition of the waste material. Subsurface injection may be accomplished by moving an injector sweep either by a vehicle supported on the artificial bed or by a movable superstructure. Repeated applications of sludge or waste may be made to the bed without plugging due to the disruptive action of the injector sweep on the bed material.

22 Claims, 7 Drawing Figures

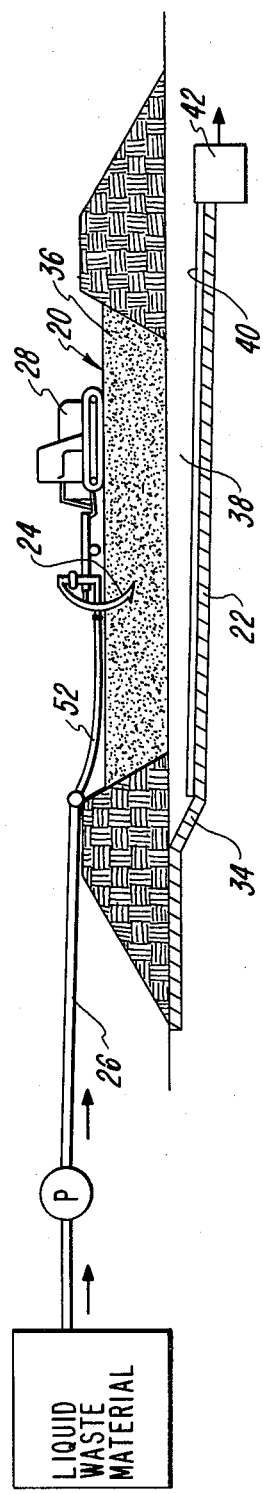
Fig_1

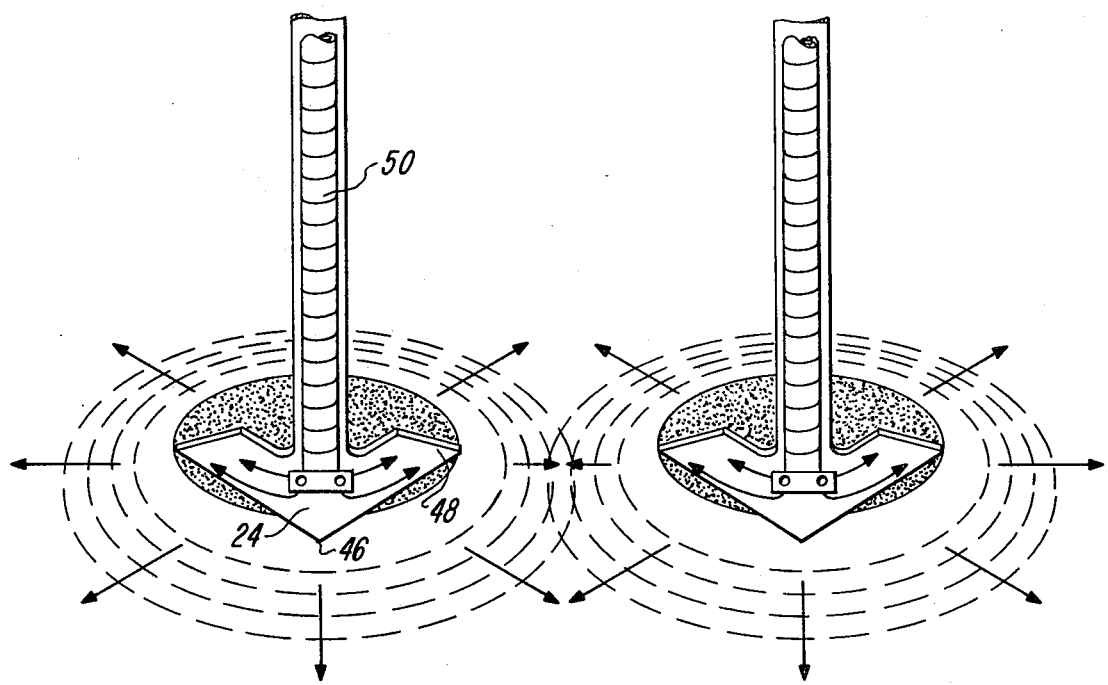
Fig_2
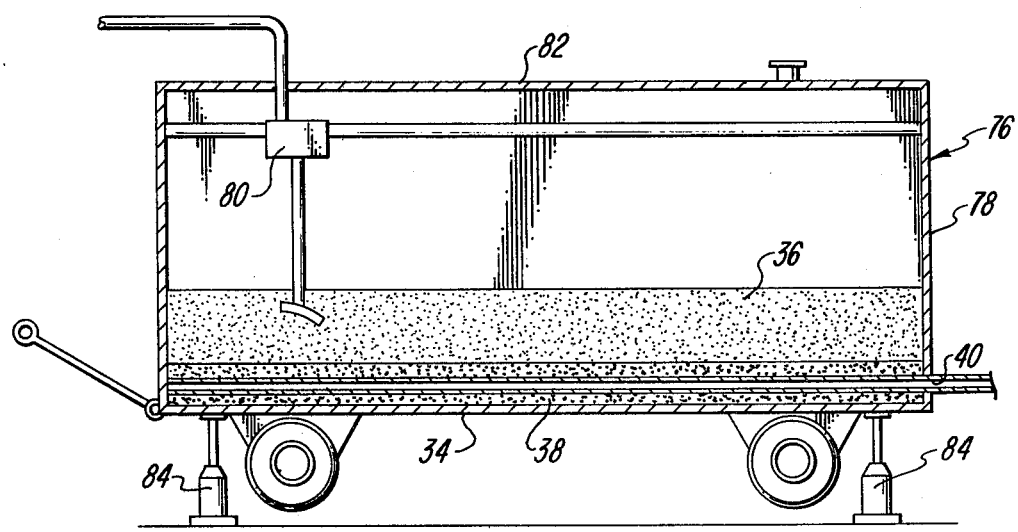
Fig_7

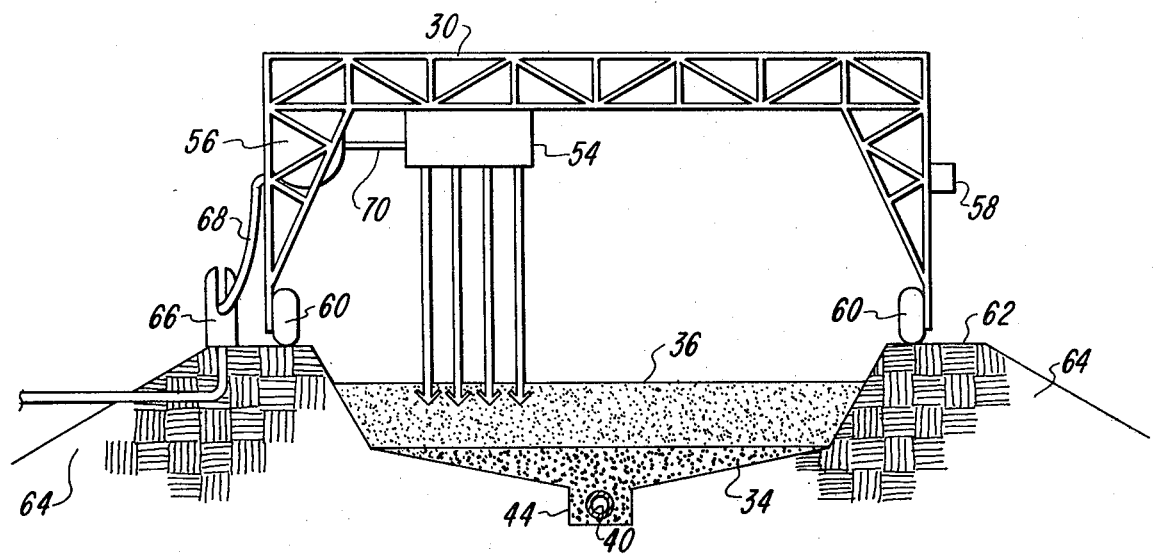
Fig_3
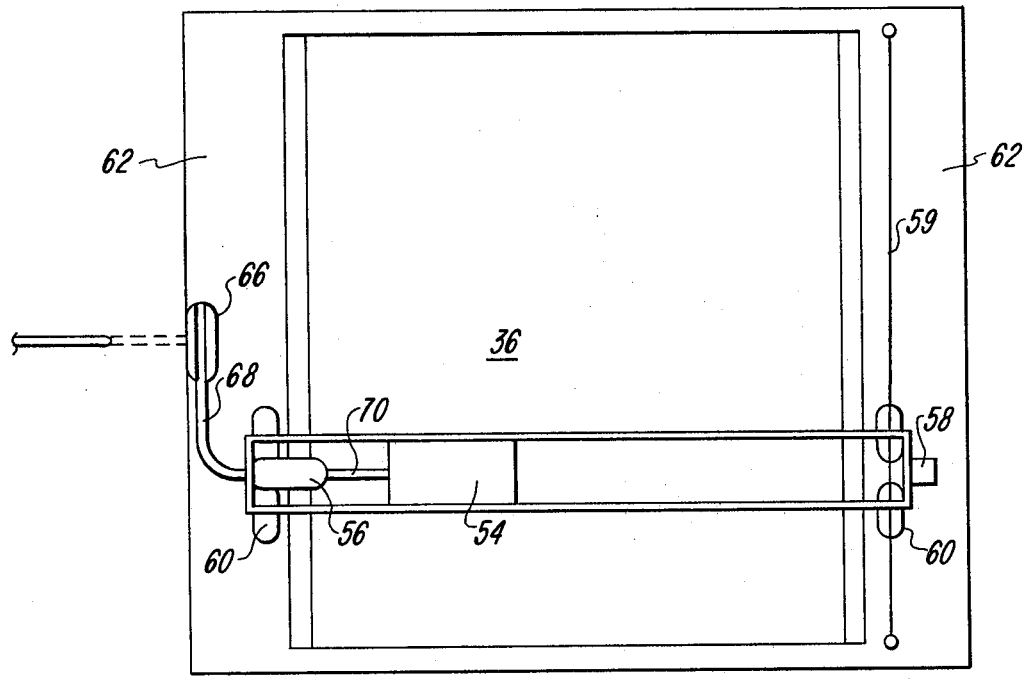
Fig_4

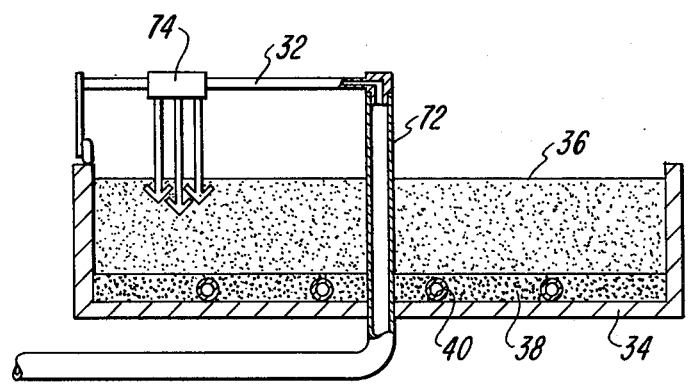
Fig_5
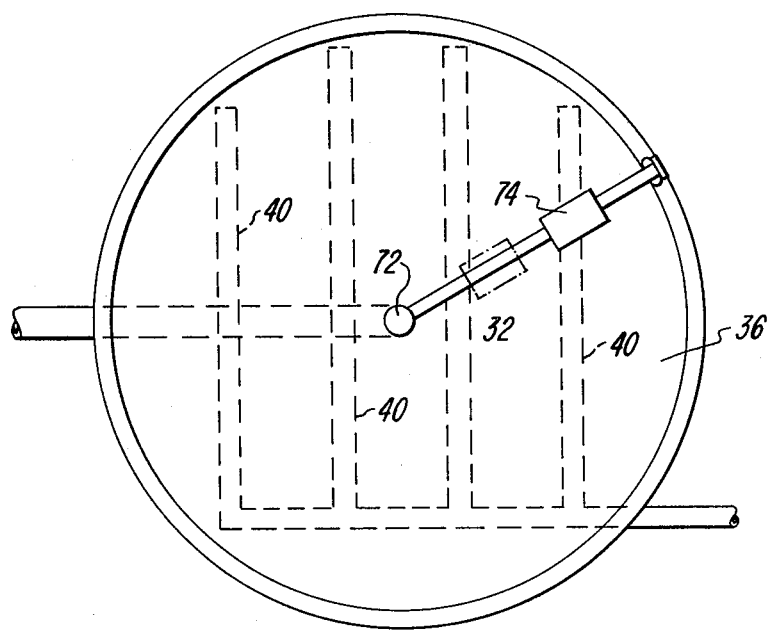
Fig_6

SUBSURFACE WASTE DISPOSAL SYSTEM

BACKGROUND OF THE INVENTION

1. Field of the Invention

The invention relates to liquid purification or separation and to processes for separation. The invention also relates to a particulate material type separator such as a sand bed, including same with rehabilitation means such as a surface traversing type.

2. Description of the Prior Art

Artificial soil beds such as sand beds are known for use in septic systems, although uniformly such beds are employed for processing liquids as compared to solids, since the long term application of solids to such beds quickly leads to plugging. U.S. Pat. No. 4,039,451 to Smith teaches an artificial bed that receives liquids, which are allowed to percolate through the bed to a collection pipe under the artificial sand bed. U.S. Pat. No. 4,100,073 to Hopcroft discloses another sand filter bed for liquids, wherein the bed is contained in a liner for preventing loss of liquid other than through the intended discharge point. The teachings of both noted patents include the removal of solids prior to application of the material to the artificial bed and in this respect are in conformity with the customary treatment practices for waste materials.

The use of land for the disposal of waste products produced by industries, municipalities and agricultural generators is a potentially efficient and environmentally sound solution to the problem of waste disposal, but it also represents technical and environmental challenges. Large areas of land may not be available or may be prohibitively expensive. Climate and soil conditions may prevent allseason use of land, and groundwater may be polluted or the risk of such occurring may be considered to be potentially high because of the waste characteristics or loading rates with consequent risk to public health. As a result, the use of land application as a disposal medium is often rejected in favor of other methods that require significant capital expenditures, demand large amounts of energy and create negative impacts to the environment.

Revision of and the creation of new, more restrictive guidelines by state and federal agencies could potentially and seriously limit the use of land as a disposal media. Land disposal of liquid waste materials has been practiced for many years in the United States under a wide range of geographic, topographic, climatic and soil conditions. Most of the operations have been accomplished without monitoring the effect on the environment. With the increase in the use of land, criteria and guidelines have been prepared for such areas as site selection and management techniques. The issuance of permits to operate the majority of these types of facilities is now a mandatory requirement. The growth of land application and the data being collected, including research and development being generated on the potential environmental impacts has caused some concerns relative to safe operations under specific physical site constraints and the local environment.

The existing guidelines also include a requirement that the waste must be stabilized—chemically or biologically. The process of stabilization tends to reduce the pathogenic population in the waste and thereby to reduce the potential risk to public health caused by transmittal through the soil system and into the groundwater. The cost of the stabilization process is high in terms of both capital facilities and operation/maintenance expenses.

Little information concerning the movement and survival of viral pathogens through the soil via percolating water is available. Many potential problems are also associated with excessive concentrations of metals and other trace elements within the waste system.

A major factor in land application of wastes is the land itself, especially the upper horizons of soil in which plants grow. Injection of sludge into the soil has been practiced, as by supplying sludge to an injector moved by a tractor. A well engineered land injection operation must recognize the limitation of the soil and then design for maximum utilization of the assimilative capacity of a soil such as its filtration, biological degradation and absorption properties. The ultimate benefit derived from the purifying and assimilating capacity of a soil is the establishment of favorable plant cover. This inevitably depends upon three closely related factors: the triad of liquid sludge properties, land and soil properties, and plant nutrient requirements.

The environmental balance of a land application system is critical for a successful system with much of the anticipated results being nonpredictable under present circumstances. The potential unknown elements in land applications have caused concern to industries and municipalities in the use of this method of waste disposal. The present invention has been developed to eliminate environmental concerns and to provide a completely controlled atmosphere in which to dispose, potentially, both nonhazardous and hazardous waste material. In addition, the system can also provide a beneficial by-product through the control of system loading rates and waste characteristics.

SUMMARY OF THE INVENTION

An artificial perched bed of selected granular soil media including a plurality of layers is adapted to intensively receive sludge and other wastes in a semi-liquid form, to retain the solids from such wastes within the bed, and to allow the liquid portion of the wastes to percolate through the bed into an underdrain system for removal from the bed. The bed includes at least two layers, in which an upper layer is formed from a relatively fine grained material and is aerobic, and a lower layer is formed from relatively coarser grained material. The underdrain system is located in the lower layer, which may be suitably separated from the upper layer to permit the passage of liquid to the lower layer while maintaining the solids in the upper layer. The underdrain system carries the collected liquid to a collection basin for monitoring, discharge, or return to the bed for further treatment. An impervious liner under the perched bed prevents seepage of effluent from the bed into the natural underlying ground and water table.

In combination with the artificial bed, a subsurface sludge injector operates to permit intensive use of the bed. The injector maintains a soil covering over the sludge at all times, thereby eliminating all potential problems such as odors, vector control, surface runoff, unsightliness, and other visual aesthetics. The deflector nozzle meters the flow of the waste forward, sideways and backwards into a subsurface cavity being continuously formed by the moving injector, thus providing even distribution of the waste material into the soil media. The deflector design both insures maximum distribution of the waste and prevents surface exposure as might be caused by excessive flow in any one direction. A shallow injection depth into the aerobic zone of the upper soil layer facilitates the microbiological decomposition of the sludge and also allows for maximum evaporation of the liquid, thereby decreasing the bed's repeat loading cycle. The subsurface injector also disrupts the surrounding soil the facilitate maximum absorption of the liquid stream. The injector provides for restructuring of the soil to prevent plugging of the bed percolation qualities.

A primary object of the invention is to provide an artificial perched bed adapted to intensively receive wastes such as sludge, to retain the sludge in the bed while separating and removing effluent through the bed, and to receive further applications of wastes without plugging.

Another important object is to provide a perched bed of granular media capable of receiving sludge on a more intense basis than is generally known for natural soils.

A further object is to provide a sludge receiving bed and a means for applying sludge to the bed such that the bed is capable of substantially continuous intense use. The bed may therefore receive sludge even if it is not sufficiently stable to bear the weight of a tractor or other vehicular application machinery. Furthermore, it then becomes possible to service the sludge and waste removal needs of small communities that lack treatment facilities or land disposal sites by periodically bringing a mobile bed to the community and intensively processing stored sludge and wastes in such a mobile bed.

Still another important object of the invention is to convert sludge into a useful product. The long term use of the aerobic zone in an artificial soil bed as the recipient of sludges results in the aerobic zone becoming a valuable top soil, which may be periodically removed and replaced by fresh granular soil media. The achievement of this object is dependent, in the practical sense, upon the ability of the bed to receive and drain the effluent from a relatively large quantity of sludge so that a sufficient quantity of organic material is introduced into the bed, and upon the ability of the bed and application technique to intermix the bed material with the sludge in such a way that aerobic action continues to treat the sludge within the bed.

These and other objects are achieved, as more fully explained below.

BRIEF DESCRIPTION OF THE DRAWINGS

FIG. 1 is a schematic drawing in vertical cross-section of a perched bed of granular media, a liquid waste material supply system, a waste material application system, and an effluent collection and disposal system, in a closed loop.

FIG. 2 is a schematic view of the type of sludge injector employed with the perched bed of FIG. 1, showing the uniform dispersion of sludge into a cavity formed by each subsurface moving sweep.

FIG. 3 is a schmetic drawing in elevation and partial vertical cross-section of an embodiment of the invention employing a moving gantry with the perched bed.

FIG. 4 is a plan view of the embodiment shown in FIG. 3.

FIG. 5 is a schematic drawing in vertical cross-section of an embodiment of the invention as practiced in a circular bed with artificial liner or tank walls.

FIG. 6 is a plan view of the embodiment of FIG. 5.

FIG. 7 is a schematic view in vertical cross-section of a portable embodiment of the perched bed.

DESCRIPTION OF THE PREFERRED EMBODIMENT

The subsurface waste disposal system is best illustrated in FIG. 1 to include a bed 20 of selected granular soil media adapted to provide properties of filtration, absorption, adsorption and microdecomposition of waste material. Beneath the bed or within the lower portion of the bed is an underdrain system 22 adapted to receive effluent that has percolated through part or all of the bed. The underdrain system collects the effluent and removes the effluent from the bed. A mobile subsurface injector means such as injector sweep 24, FIG. 2, injects a mixture of solid and liquid wastes into the granular media while maintaining the wastes out of communication with the atmosphere above the bed. The waste materials are supplied to the injector by a suitable supply means such as conduit 26, connected to a reservoir containing the wastes. The injector is moved in the bed during the injection process so that the wastes are deposited over the area of the bed. Means for moving the injector may include a tractor 28 or movable superstructure such as a gantry 30, FIG. 3, or rotating arm 32, FIG. 5. The bed and underdrain system are isolated from the underlying soil by an effluent impervious liner 34, which may be either synthetic or natural in composition. The underdrain system will therefore carry substantially all of the percolated effluent out of the bed, and an effluent collection means such as a collection basin may receive the effluent and and retain it for monitoring and, if necessary, further treatment.

The bed 20 is preferred to be horizontally elongated in a square or rectangular configuration in the embodiment of FIGS. 1 and 4, or round in the embodiment of FIG. 5, and the bed is totally enclosed except for an open top. The bed is composed of multiple layers of granular soil material including an upper layer 36 of selected material with a minimum depth of eighteen inches. Below the upper layer is a lower layer 38 of relatively coarser material such as crushed rock, which is placed on the impervious liner 34.

The underdrain system 22 may be constructed of perforated piping or drain tile 40 installed within the lower bed 38 and longitudinally sloped to carry the collected effluent away from the selected upper layer and gravel layer to a collection basin 42 external to the bed. As best shown in FIG. 3, the underdrain system may be located in one or more trenches 44 filled with the coarser material of lower layer 38. The floor of the bed is preferred to be sloped toward the trenches when the impervious liner 34 is synthetic, as shown in FIG. 3; although the floor of the bed may be approximately level if the liner is natural, thus relying upon the greater permeability of the lower layer to cause the effluent to enter the trenches.

The impervious liner is selected according to the requirements of the local soil and the total design of the waste disposal system. Synthetic liners are those artificially created and may be constructed from such materials as asphalt, cement, or polyvinyl sheeting. Natural liners include native soils that are relatively impervious to effluent penetration and most typically would be constructed of clay.

Injector sweep 24, FIG. 2, may be of known design providing a narrow, downwardly extending tip 46 and a relatively broader tail 48 in a generally wedge-shaped horizontal profile. The underside of the injector sweep is upwardly concave to create a natural cavity for reception of the waste material, which is deflected in all directions within the cavity from its injection point of injector shank 50. Although the shank 50 is moved through the bed media, the injected sludge is never exposed to the surface because the wedge-shaped sweep body covers the cavity and injected sludge over a broader area than remains uncovered behind the moving sweep as the media closes behind the shank. The sweep also disrupts the media layer 36 as it moves and thereby prevents plugging of layer 36 by preventing the formation of a continuous layer of injected sludge from repeated application of wastes to the same bed area. The injector sweep is carried by the moving means to add the wastes to the bed in the aerobic zone, preferably at a depth of from six to ten inches in the eighteen inch deep upper layer. The solids in the waste become suspended in the upper layer while the liquid percolates through the upper and lower layers to the underdrain system. Effluent collected in the collection basin 42 may be monitored for quality prior to either discharge or further treatment, such as return of the effluent to the bed or the addition of chlorine to reduce pathogen microorganisms as required.

In FIG. 1, one embodiment of the injector moving means is tractor 28 pulling a laterally spaced plurality of injectors. A flexible delivery hose 52 connected between the tractor and a conduit 26 may supply wastes from a suitable supply reservoir such as a tanker truck, railroad car, holding pond, lagoon, or storage tanks. A limitation on the use of tractors is that the artificial bed must be maintained in condition to support the tractor weight. For this reason, alternate means for moving the injector may be preferred.

In FIGS. 3 and 4 a gantry system 30 is shown. This system employs a carriage 54 capable of moving transversely on the gantry 30, while the gantry itself is movable longitudinally. The carriage is connected to the injector sweeps and supplies the waste material via a first flexible hose carried on reel 56. The gantry may include a power drive 58 drawing on cable 59 to move the gantry on wheels 60 on a suitable support surface such as rails or asphalt track 62 carried on the sides of the bed, such as on berms 64. A stationary reel 66 may be mounted near an edge of the bed and carry a second flexible hose 68 supplying waste to first hose 70 from the sludge source. The hose reels 56 and 66 operate on substantially perpendicular axes, each delivering hose in a single plane for minimal wear on the hoses 68 and 70.

A circular disposal system as shown in FIGS. 5 and 6 may receive wastes or sludge from a fixed central conduit 72 supplying injectors carried on a carriage 74 movable along a radial arm 32. This embodiment is otherwise similar to the gantry of FIGS. 3 and 4, but is adapted for use with many existing types of circular tanks in sludge disposal systems.

A portable system 76 is well adapted for use in temporary or intermittent situations, such as small towns having the capacity to store wastes for substantial periods of time. This system, best shown in FIG. 7, employs the bed in a movable carrier such as a truck trailer or railroad car 78. The injectors are carried on a carriage 80 suspended above the bed by a rail system connected to the sides of the trailer. A sludge delivery pipe or flexible hose is connected between the carriage and the sludge source. The trailer top 82 may be open to allow ventilation and evaporation. During the time the trailer is in use at a site, the trailer may be supported on jacks 84. However, when use is complete and the trailer is to be moved, the weight may be substantially reduced after drainage of the effluent.

In all of the above noted embodiments, the waste disposal system provides the capability to monitor the effluent quality and to reprocess any effluent not meeting specified standards. A further benefit is that the top portion of the upper layer may be periodically cycled as top soil.

Waste material such as sludge is best applied to the bed at a rate between one inch and one and one-quarter inches per square foot of bed horizontal area per week. Tests have shown that the percolation rate of the selected soil media is in excess of six inches per hour as contrasted to normal soil which ranges from one-tenth inch per hour for tight clay soil to two inches per hour for solid agricultural soils. The preferred selected soil media is a sand with minimum clay content and the following gradation:

TABLE 1

| Effective Size $(D_{10})$ in mm. | Grain Size Analysis | | Clay Content Less Than .002 mm. in % |
|---|---|---|---|
| | Uniformity Coefficient (Cu) | Gradation Curve | |
| .35 to .50 | 3.0 | * | 3 |

*Ratio of the sieve size for the material passing the 95% and 5% scale should be as close to 4 to 1 as possible.

As an example of the quantitative performance that may be achieved by use of the perched bed, industrial wastes have been applied and the effluent monitored. Both incoming and outgoing studies were conducted to determine quantitative removal of undesirable elements. Table 2 shows the results of two compositions of incoming wastes and the resultant effluent composition:

TABLE 2

| | Effluent Characteristics of Two Samples | | | |
|---|---|---|---|---|
| | Sample 1 Effluent Values (mg/l) | | Sample 2 Effluent Values (mg/l) | |
| Elements | In | Out | In | Out |
| TSS | 5,992 | 2–8 | 12,300 | 2–8 |
| BOD | 1,183 | 6 | 100 Soluble | — |
| COD | 38,491 | 30 | 300 Soluble | 200 |
| $NH_3$—N | 260 | 0.02 | 1,250 | 2.6–15 |
| Chlorides | 491.7 | 65.0 | 598 | 77 |
| Cd | 0.01 | 0 | 0 | 0 |
| Zn | 27 | 0 | 5.4 | 0 |
| Ni | 1,065 | 0 | 124 | N.D.* |
| Pd | 0.03 | 0 | N.D.* | N.D.* |
| Cu | 16 | 0 | 1.9 | 0 |

*N.D. = nondetectable

Excessive water caused by heavy precipitation can temporarily pond on the bed, but sufficient freeboard is maintained to insure that the design storm intensity frequency can be totally captured on the bed without runoff. The excess water percolates rapidly through both layers of bed media into the bed underdrain for removal from the bed. This rapid flushing of the soil can cause some increases in the soluble elements being moved through the bed more rapidly than normal. Due to this fact, it may be necessary to pump this liquid from the collection basin back to the bed for further treatment. In heavy precipitation areas of the country, an open type shed roof is desired for proper operation of the bed.

A perched bed of the type described provides a disposal site for sludge and other wastes even in areas where the natural soil is unsuitable for normal application of sludge to land or where land is not available in the quantity necessary for treatment of the supply of wastes. The land area employed for the perched bed is intensively used and therefore offers great flexibility in design of the disposal area for large or small needs. The effluent may be monitored by automatic or semiautomatic control, as in most instances the only alternatives are to discharge the effluent, recycle the effluent through the bed, or add a chemical treatment to the effluent. The embodiments employing mechanical superstructures for the operation of the injectors also permit continuous operation with minimum labor requirements. Such externally supported injector moving devices also eliminate the need to maintain the bed in condition to support the tractor or like ground engaging unit, and in the case of the vehicle mounted bed, permit the system to be portable.

The sludge handling capability of the perched bed waste disposal system is dependent upon a variety factors such as the local climate, including annual rainfall, and upon the degree to which the composition of the upper bed layer 36 conforms to the specifications of Table 1, above. Therefore, the following example of bed performance is provided for purposes of illustration only, as both higher and lower capacities may be achieved. A typical application of the system may convey aerobically digested liquid sludge having from 1% to 3% solids content from a lagoon to the injector for application to the perched bed at a rate of up to 1000 gallons per minute. In a bed capable of hydraulic loading of applied liquid of fifty-four inches per acre per year, annular bed loading per acre may be 1,400,000 gallons of wet solids, corresponding to 60 tons of dry solids. The solids maintained in upper media layer 36 is subjected to known soil benefits of filtration, absorption, adsorption, and microbic decomposition, with the repeated restructuring of the bed with each repeated pass of the injector sweep assisting in maintaining the aerobic quality of the layer 36. On a five year cycle, the top six inches of the eighteen inch deep upper layer is removed and replaced with clean media to insure bed performance. The removed media may be used as a top soil as a beneficial by-product of the system.

I claim:

1. A subsurface waste disposal and treatment system, comprising:
    (a) a bed of granular media including a first, aerobic layer of relatively fine media consisting essentially of media having an effective grain size ($D_{10}$) approximately in the range of 0.35 mm. to 0.50 mm. and a clay content less than 0.002 mm of not more than substantially 3%, such that the first layer is capable of retaining and aerobically degrading solids from an injected sludge of mixed solid and liquid content, wherein the sludge has a solids content of at least one percent, and permitting effluent from the sludge to percolate therethrough at a rate in excess of two inches per hour, and a second layer below said first layer of relatively coarser material;
    (b) an underdrain system located below said first layer and in communication with said second layer for receiving effluent percolated through the first layer and removing effluent from the bed;
    (c) a mobile subsurface injector means adapted to inject a sludge of mixed solid and liquid form and having a solids content of at least one percent into and below the surface of said first, aerobic layer of granular media;
    (d) means for supplying waste materials to said injector means for injection into the first layer; and
    (e) means moving said injector means in said aerobic first layer during waste material injection.

2. The waste disposal system of claim 1, further comprising an effluent collection means for receiving effluent from said underdrain system and retaining the effluent for monitoring prior to further disposition thereof.

3. The waste disposal system of claim 1, wherein said bed further comprises an effluent impervious liner below said second layer and beneath said underdrain system for sealing the bed from loss of effluent through said liner.

4. The waste disposal system of claim 1, wherein said moving means comprises:
    (a) a superstructure;
    (b) carriage means supported by said superstructure for movement with respect to the superstructure, said carriage means being connected to at least one injector means;
    (c) means for moving said superstructure with respect to said bed; and
    (d) means for supporting the weight of said superstructure externally of said bed.

5. The waste disposal system of claim 4, wherein said superstructure comprises a gantry; said carriage means is connected to the gantry for movement along a first axis; and said supporting means is adapted for gantry movement along a second axis substantially perpendicular to the first axis.

6. The waste disposal system of claim 5, wherein said supporting means comprises a pair of berms having gantry support surfaces on the top side thereof, said berms being on opposite sides of said bed.

7. The waste disposal system of claim 4, wherein said superstructure comprises a radial arm having a central connection to an upstanding waste supply means; and said carriage is connected to the radial arm for longitudinal movement along the arm, said arm being pivotable about said central connection.

8. The waste disposal system of claim 4, further comprising a movable vehicle containing said bed and superstructure.

9. The waste disposal system of claim 1, wherein said first media layer consisting essentially of sand having a gradation curve wherein the ratio of the sieve size for the material passing the 95% and 5% scale is substantially 4 to 1.

10. The waste disposal system of claim 1, wherein said first media layer consists essentially of sand having a uniformity coefficient ($C_u$) of approximately 3.

11. The waste disposal system of claim 1, wherein said mobile subsurface injector means is adapted to restructure said first layer as the injector means moves therethrough for preventing formation of a continuous layer of injected solid wastes.

12. The waste disposal system of claim 1 wherein said first media layer comprises sand having a uniformity coefficient (Cu) of approximately 3 and having a gradation curve wherein the ratio of the sieve size for the material passing the ninety-five percent and five percent scale is substantially 4 to 1.

13. The method of sludge treatment with decomposition of the solids portion thereof, comprising:

(a) providing a bed of granular media including a first, aerobic layer of relatively fine media consisting essentially of media having an effective grain size ($D_{10}$) approximately in the range of 0.35 mm. to 0.50 mm. and a clay content less than 0.002 mm of not more than substantially 3% capable of retaining and aerobically decomposing solids from an injected liquid sludge having a solids content of at least one percent, while permitting effluent from the sludge to percolate therethrough at a rate in excess of two inches per hour under conditions equivalent to an approximate annual hydraulic bed loading of at least fifty-four inches, and a second layer of relatively coarser media than said first layer, located below the first layer, capable of permitting percolation of effluent at a relatively greater rate than the first layer;

(b) providing an underdrain system located below said first layer and in communication with said second layer for receiving sludge effluent percolated through the first layer and removing effluent from the bed;

(c) providing a mobile subsurface injector means for injecting liquid sludge having a solids content of at least one percent into a subsurface, aerobic portion of the first layer while moving therethrough and restructuring the first layer to prevent formation of a continuous layer of injected sludge;

(d) supplying liquid sludge having a solids content of at least one percent to said injector means while simultaneously moving the injector means through the aerobic portion of the first layer and restructuring the first layer to prevent formation of a continuous layer of injected sludge;

(e) substantially retaining the solids content of the liquid sludge within said first layer and subjecting said retained solids to aerobic decomposition; and (f) collecting percolated effluent in said underdrain system and removing the effluent from the bed.

14. The method of claim 13, further comprising: repeatedly performing step (d) in substantially the same portion of the first media layer; and removing at least a portion of the first media layer subjected to said repeated performance of step (d) and adding in its place a relatively fine media, with respect to said second layer, capable of retaining solids from liquid sludge and permitting effluent from the sludge to percolate therethrough.

15. The method of claim 14, wherein said first layer is approximately at least eighteen inches in depth, and the portion thereof removed is approximately at least six inches in depth.

16. The method of claim 13, wherein the liquid sludge supplied to said injector means comprises substantially no more than 3% solids.

17. The method of claim 13, further comprising: supporting said injector means for movement through the bed from a superstructure carried by a surface substantially external of the bed for permitting injection of sludge into the bed when the bed is unsuited to directly support an injector moving means.

18. The method of claim 13, further comprising: monitoring the composition of said collected effluent from said underdrain system and returning the collected effluent to the first layer of the bed for re-percolation in response to detected effluent constituent concentrations above pre-selected levels of the monitoring process.

19. The method of claim 13, further comprising: providing an effluent impervious liner below said bed and underdrain system to substantially eliminate downward effluent removal from the bed other than through the underdrain system.

20. The method of claim 13 wherein said first media layer further comprises sand having a gradation curve wherein the ratio of the sieve size for the material passing the ninety-five percent and five percent scale is substantially 4 to 1.

21. The method of claim 13 wherein said first media layer comprises sand having a uniformity coefficient (Cu) of approximately 3.

22. The method of claim 13 wherein said first media layer comprises sand having a uniformity coefficient (Cu) of approximately 3, said first media layer further comprises sand having a gradation curve wherein the ratio of the sieve size for the material passing the ninety-five percent and five percent scale is substantially 4 to 1.

* * * * *